(12) United States Patent
Wu et al.

(10) Patent No.: US 11,282,475 B2
(45) Date of Patent: Mar. 22, 2022

(54) ELECTRONIC DEVICE CONTROL METHOD AND ELECTRONIC DEVICE APPLYING THE ELECTRONIC DEVICE CONTROL METHOD

(71) Applicant: HIMAX TECHNOLOGIES LIMITED, Tainan (TW)

(72) Inventors: Chih-Ming Wu, Tainan (TW); Yaw-Guang Chang, Tainan (TW); Chin-Jung Chen, Tainan (TW); Yu-Feng Lin, Tainan (TW); Chung-Wen Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 91 days.

(21) Appl. No.: 16/520,338

(22) Filed: Jul. 23, 2019

(65) Prior Publication Data

US 2021/0027740 A1    Jan. 28, 2021

(51) Int. Cl.
*G09G 5/00* (2006.01)
*G06F 3/041* (2006.01)
*G10L 25/51* (2013.01)

(52) U.S. Cl.
CPC ........... *G09G 5/003* (2013.01); *G06F 3/0412* (2013.01); *G06F 3/0416* (2013.01); *G10L 25/51* (2013.01); *G09G 2354/00* (2013.01)

(58) Field of Classification Search
CPC .... G09G 5/003; G09G 2354/00; G10L 25/51; G06F 3/0416; G06F 3/0412
See application file for complete search history.

(56) References Cited

U.S. PATENT DOCUMENTS

| | | | |
|---|---|---|---|
| 9,268,433 B2* | 2/2016 | Al-Dahle | G06F 1/3262 |
| 9,285,937 B2 | 3/2016 | Kida | |
| 9,798,415 B2* | 10/2017 | Azumi | G06F 3/04184 |
| 10,642,405 B2* | 5/2020 | Kuroiwa | G09G 3/3648 |
| 2012/0194471 A1* | 8/2012 | Park | G06F 3/0446 |
| | | | 345/174 |
| 2012/0218482 A1* | 8/2012 | Hwang | G06F 3/0445 |
| | | | 349/12 |
| 2014/0152617 A1* | 6/2014 | Kida | G06F 3/0446 |
| | | | 345/174 |
| 2014/0160061 A1* | 6/2014 | Kim | G09G 3/3677 |
| | | | 345/174 |
| 2014/0160067 A1* | 6/2014 | Kim | G06F 3/04166 |
| | | | 345/174 |

(Continued)

FOREIGN PATENT DOCUMENTS

CN    108874205 A    11/2018
JP    2017-91224 A    5/2017

(Continued)

*Primary Examiner* — Benyam Ketema
(74) *Attorney, Agent, or Firm* — Winston Hsu

(57) ABSTRACT

An electronic device control method applied to an electronic device can operate in a display mode and a touch sensing mode. The method comprises: (a) controlling the electronic device to have a first mode switch frequency; and (b) controlling the electronic device to have a second mode switch frequency different from the first mode switch frequency. The first mode switch frequency and the second mode switch frequency are frequencies for switching between the display mode and the touch sensing mode.

16 Claims, 7 Drawing Sheets

(56) References Cited

U.S. PATENT DOCUMENTS

| | | | |
|---|---|---|---|
| 2014/0168151 A1* | 6/2014 | Noguchi | G06F 3/0418 345/174 |
| 2014/0292711 A1 | 10/2014 | Teranishi | |
| 2014/0320446 A1* | 10/2014 | Kim | G09G 3/3688 345/174 |
| 2015/0378499 A1* | 12/2015 | Choi | G06F 3/0412 345/174 |
| 2015/0378509 A1* | 12/2015 | Choi | G06F 3/0412 345/173 |
| 2016/0077617 A1* | 3/2016 | Lee | G06F 3/044 345/173 |
| 2017/0010739 A1* | 1/2017 | Ito | G06F 3/0412 |
| 2017/0269772 A1* | 9/2017 | Noto | G02F 1/13338 |
| 2018/0004343 A1 | 1/2018 | Shin | |
| 2018/0032248 A1 | 2/2018 | Kim | |
| 2018/0329570 A1 | 11/2018 | Chan | |

FOREIGN PATENT DOCUMENTS

| | | |
|---|---|---|
| KR | 10-2014-0075542 A | 6/2014 |
| KR | 10-2014-0077839 A | 6/2014 |
| KR | 10-2014-0117284 A | 10/2014 |
| KR | 10-2018-0003369 A | 1/2018 |
| KR | 10-2018-0014644 A | 2/2018 |
| TW | 201901386 A | 1/2019 |
| TW | I647603 B | 1/2019 |
| WO | 2014/000362 A1 | 1/2014 |

\* cited by examiner

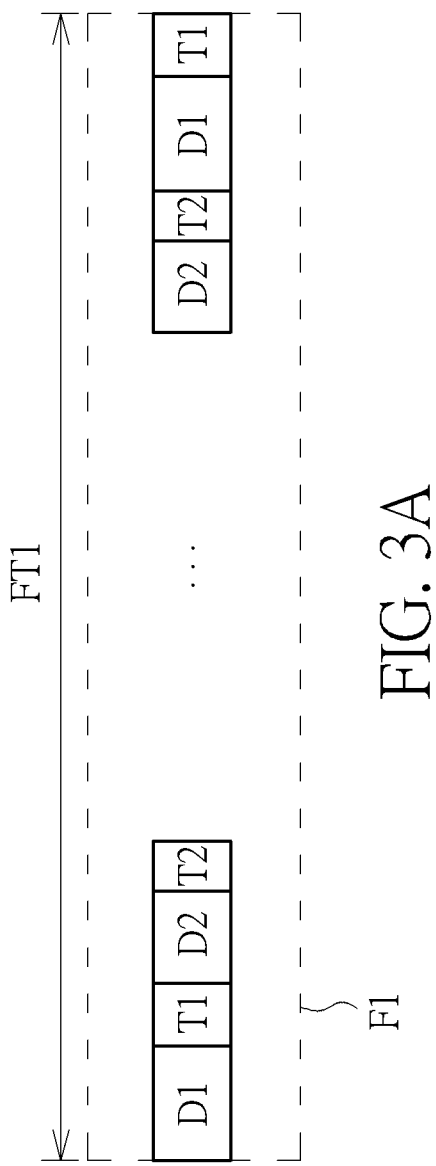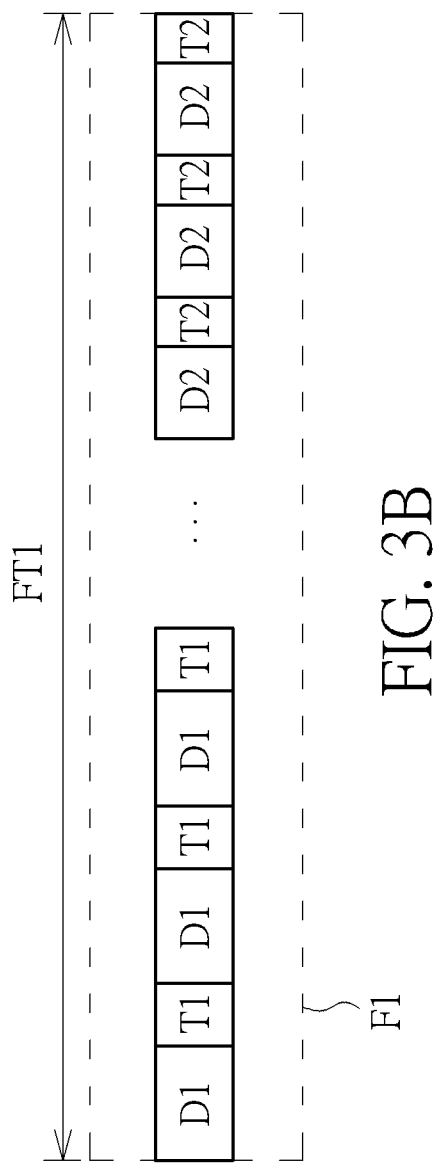

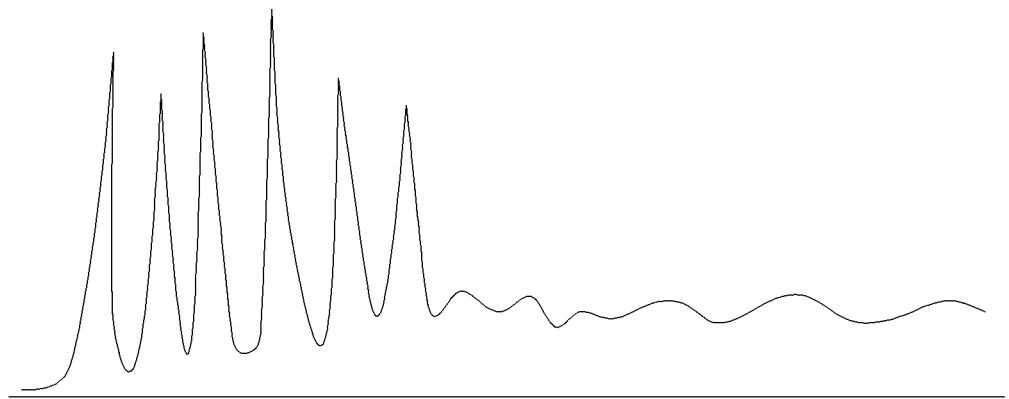
Prior art
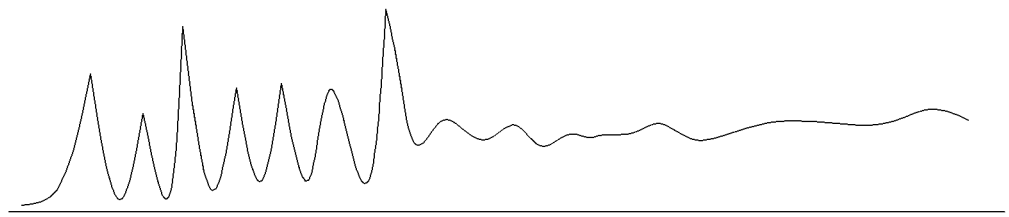
Invention
FIG. 8

ELECTRONIC DEVICE CONTROL METHOD AND ELECTRONIC DEVICE APPLYING THE ELECTRONIC DEVICE CONTROL METHOD

BACKGROUND OF THE INVENTION

1. Field of the Invention

The present invention relates to an electronic device control method and an electronic device applying the electronic device control method, and particularly relates to an electronic device control method and an electronic device applying the electronic device control method which can reduces the audio noise.

2. Description of the Prior Art

An electronic device having a display function and a touch sensing function, such as a touch screen, becomes more and more popular in recent years. Accordingly, the electronic device may switch between a display mode and a touch sensing mode. However, since the components in the electronic device operate in different states in the display mode and the touch sensing mode. The electronic device may generate some audible noises due to the switching between different modes.

FIG. 1 is a schematic diagram illustrating a conventional mode switch operation. In FIG. 1, FT1 means the frame time of the frame F1 and FT2 means the frame time of the frame F2. Also, D means the display time in which the electronic device operates in the display mode and T means the touch sensing time in which the electronic device operates in the touch sensing mode. Therefore, in view of FIG. 1, the electronic device periodically switches between the display mode and the touch sensing mode.

However, since the switch frequency is fixed, which means the display time D and the touch sensing time T are the same in each frame, large audible noise may be generated, thus may cause poor user experience.

SUMMARY OF THE INVENTION

Therefore, one objective of the present invention is to provide an electronic device control method which can reduce audible noise.

Another objective of the present invention is to provide an electronic device which can reduce audible noise.

One embodiment of the present invention is to provide an electronic device control method applied to an electronic device can operate in a display mode and a touch sensing mode. The method comprises: (a) controlling the electronic device to have a first mode switch frequency; and (b) controlling the electronic device to have a second mode switch frequency different from the first mode switch frequency. The first mode switch frequency and the second mode switch frequency are frequencies for switching between the display mode and the touch sensing mode.

Another embodiment of the present invention is to provide an electronic device comprising: a display; a touch interface; and a processing circuit, coupled to the display and the touch interface. The processing circuit controls the electronic device to operate at a first mode switch frequency and a second mode switch frequency different from the first mode switch frequency. The first mode switch frequency and the second mode switch frequency are frequencies for switching between the display mode and the touch sensing mode.

In view of above-mentioned embodiments, the audible noise of the electronic device using the electronic device control method provided by the present invention may have smaller peaks since the electronic device use different mode switch frequencies.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2, FIG. 3A and FIG. 3B are schematic diagrams illustrating mode switch operations according to different embodiments of the present invention.

FIG. 8 is a schematic diagram illustrating the advantage which the present invention can provide.

DETAILED DESCRIPTION

Several embodiments are provided in following descriptions to explain the concept of the present invention. Please note, the following steps can be implemented by hardware (e.g. circuit or device) or by firmware (e.g. a processor installed with at least one program). Further, in following embodiments, an electronic device comprising a touch screen is taken as an example for explaining, but the following embodiments can be applied to any electronic device having a display can perform a display function and having a touch interface can perform a touch sensing function.

Figure 1:
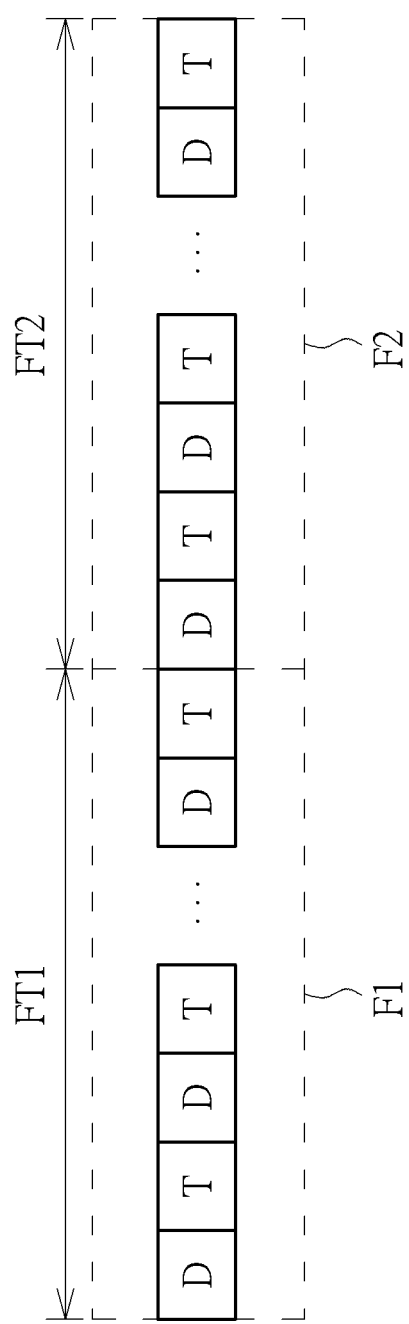
FIG. 1 is a schematic diagram illustrating a conventional mode switch operation.
Figure 2:
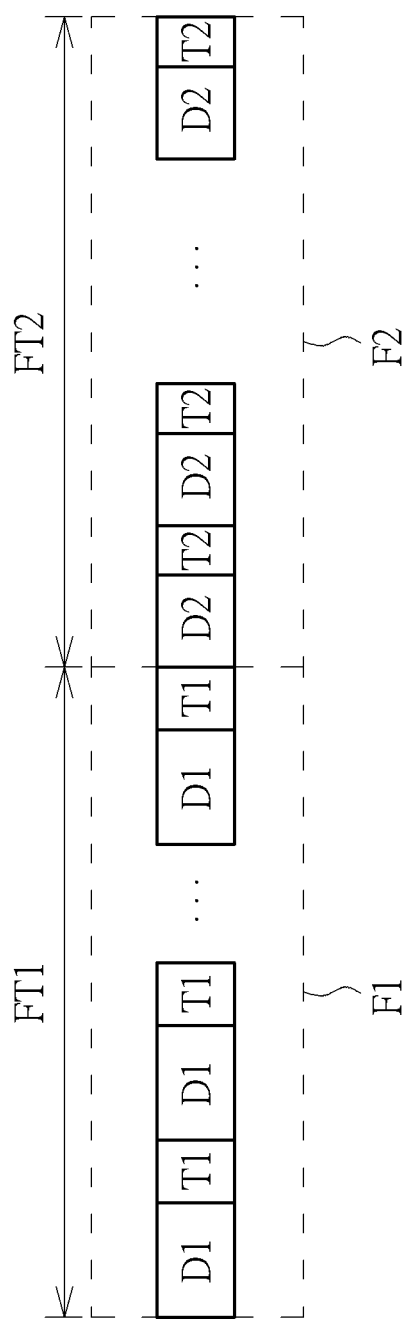
Figure 4:
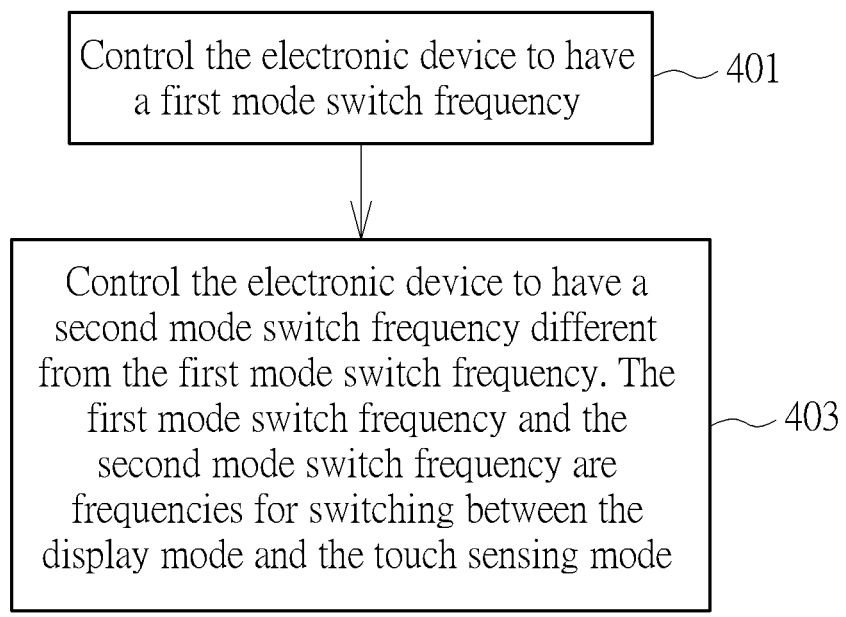
FIG. 4 is a flow chart illustrating an electronic control method according to one embodiment of the present invention.

FIG. 2 is a schematic diagram illustrating mode switch operations according to one embodiment of the present invention. As illustrated in FIG. 2, the frame time FT1 is a frame time of the frame F1 and the frame time FT2 is a frame time of the frame F2. The frame F2 is a frame different from the frame F1. In one embodiment, the frame F2 is a frame following the frame F1, but not limited.

In the embodiment of FIG. 2, the electronic device has different mode switch frequencies during different frame time. In other words, the mode switch frequency of the electronic device during the frame time FT1 is different from the mode switch frequency of the electronic device during the frame time FT2. The mode switch frequency means the frequency for switching between the display mode and the touch sensing mode. The display mode means the electronic device can display images and the touch sensing mode means the electronic device can sense touch of an object (e.g. a finger). Specifically, during the frame time FT1, the electronic device operates in the display mode during the display time D1 and operates in the touch sensing mode during the touch sensing time T1. Also, during the frame time FT2, the electronic device operates in the display mode during the display time D2 different from the display time D1, and operates in the touch sensing mode during the touch sensing time T2 different from the touch sensing time T1. In one embodiment, a sum of total display time D1 and a sum of total display time D2 are the same, in order to display a complete frame in the frame time of a single frame.

In the embodiment of FIG. 3A, the electronic device has more than one mode switch frequencies during the frame time of a single frame. As illustrated in FIG. 3A, the electronic device first operates in the display mode during the display time D1 and operates in the touch sensing mode during the touch sensing time T1 in the frame time FT1. After that, the electronic device operates in the display mode during the display time D2 and operates in the touch sensing mode during the touch sensing time T2 in the frame time FT1. That is, the display time in the frame time FT1 has more one values and the touch sensing time in the frame time FT1 also has more one values, thus the electronic device has more than one mode switch frequencies during the frame time FT1. However, it will be appreciated that arrangement of display times and touch sensing times are not limited to the embodiment of FIG. 3A. Take FIG. 3B for example, the electronic device also have two display times D1, D2 and two touch sensing times T1, T2 in the frame time FT1. The display time D1, the touch sensing time T1, the display time D2, the touch sensing time T2 are alternatively used in the embodiment of FIG. 3A. However, in the embodiment of FIG. 3B, the display time D1, the touch sensing time T1 are first used for several times and then the display time D2, the touch sensing time T2 are used until the frame time FT1 is over.

Please note, the electronic device has two mode switch frequencies in the embodiments of FIG. 3A and FIG. 3B. However, the electronic device can have more than two mode switch frequencies during frame time of a single frame. Besides, the embodiment shown in FIG. 2 and the embodiments shown in FIG. 3A and FIG. 3B can be combined. For example, the electronic device can have more than one mode switch frequencies in the frame time FT1, and has only one mode switch frequency in the frame time FT2. Such combination or variation should also fall in the scope of the present invention.

In view of above-mentioned embodiments, an electronic device control method can be acquired, which is applied to an electronic device can operate in a display mode and a touch sensing mode. The electronic device control method comprises:

Step 401

Control the electronic device to have a first mode switch frequency.

Step 403

Control the electronic device to have a second mode switch frequency different from the first mode switch frequency. The first mode switch frequency and the second mode switch frequency are frequencies for switching between the display mode and the touch sensing mode.

In one embodiment, the electronic device has the first mode switch frequency during a first frame time of a first frame (e.g. the frame F1 in FIG. 2) and has the second mode switch frequency during a second frame time of a second frame (e.g. the frame F2 in FIG. 2). Further, in another embodiment, the electronic device has the first mode switch frequency and the second mode switch frequency during a first frame time of a first frame (e.g. the frame F1 in FIG. 3A and FIG. 3B). Other details are illustrated in above-mentioned embodiments, thus are omitted for brevity here.

Figure 5:
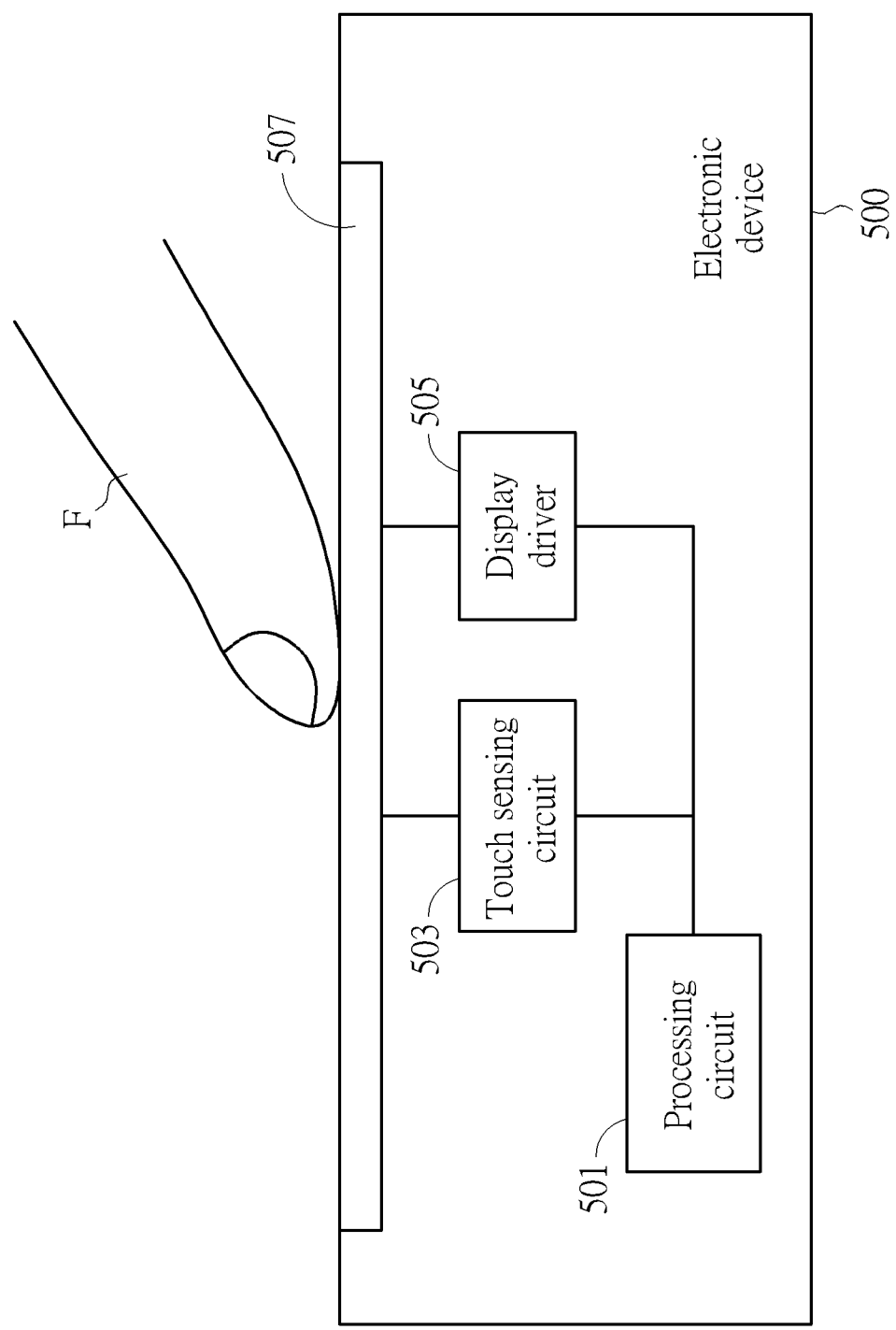
FIG. 5 is a block diagram illustrating an electronic device applying the electronic control method provided by the present invention.

FIG. 5 is a block diagram illustrating an electronic device applying the electronic control method provided by the present invention. Please note the electronic device illustrated in FIG. 5 is only for example. The electronic control method provided by the present invention can be applied to any electronic device having a display function and a touch sensing function. As illustrated in FIG. 5, the electronic device 500, such as a mobile phone or a tablet computer, comprises a processing circuit 501, a touch sensing circuit 503, a display driver 505, and a touch screen 507. The touch sensing circuit 503 is configured to control the touch sensing operation of the touch screen 507, and the display driver 505 is configured to control the display operation of the touch screen 507. Also, the processing circuit 501, such as a MCU, is configured to control all components in the electronic device 500.

Therefore, in the display mode, the processing circuit 501 gives commands to the display driver 505, to control the touch screen 507 to display at least part of a frame. Besides, in the touch sensing mode, the processing circuit 501 gives commands to the touch sensing circuit 501, to control the touch screen 507 to detect a touch of an object (e.g. the finger F). In one embodiment, the touch sensing circuit 503 or the display driver 505 can be integrated to the processing circuit 501. Further, in one embodiment, the touch sensing circuit 503 and the display driver 505 are integrated to a TDDI (Touch with Display Driver) IC. Please note, the touch screen 507 can be regarded as integration of a display and a touch interface. Accordingly, the electronic device provided by the present invention may have a display and a touch interface which are independent in another embodiment.

As above-mentioned the electronic device may generate audible noise due to the electronic device switching between the display mode and the touch sensing mode. Therefore, the present invention further provides methods to detect such audible noise.

Figure 6:
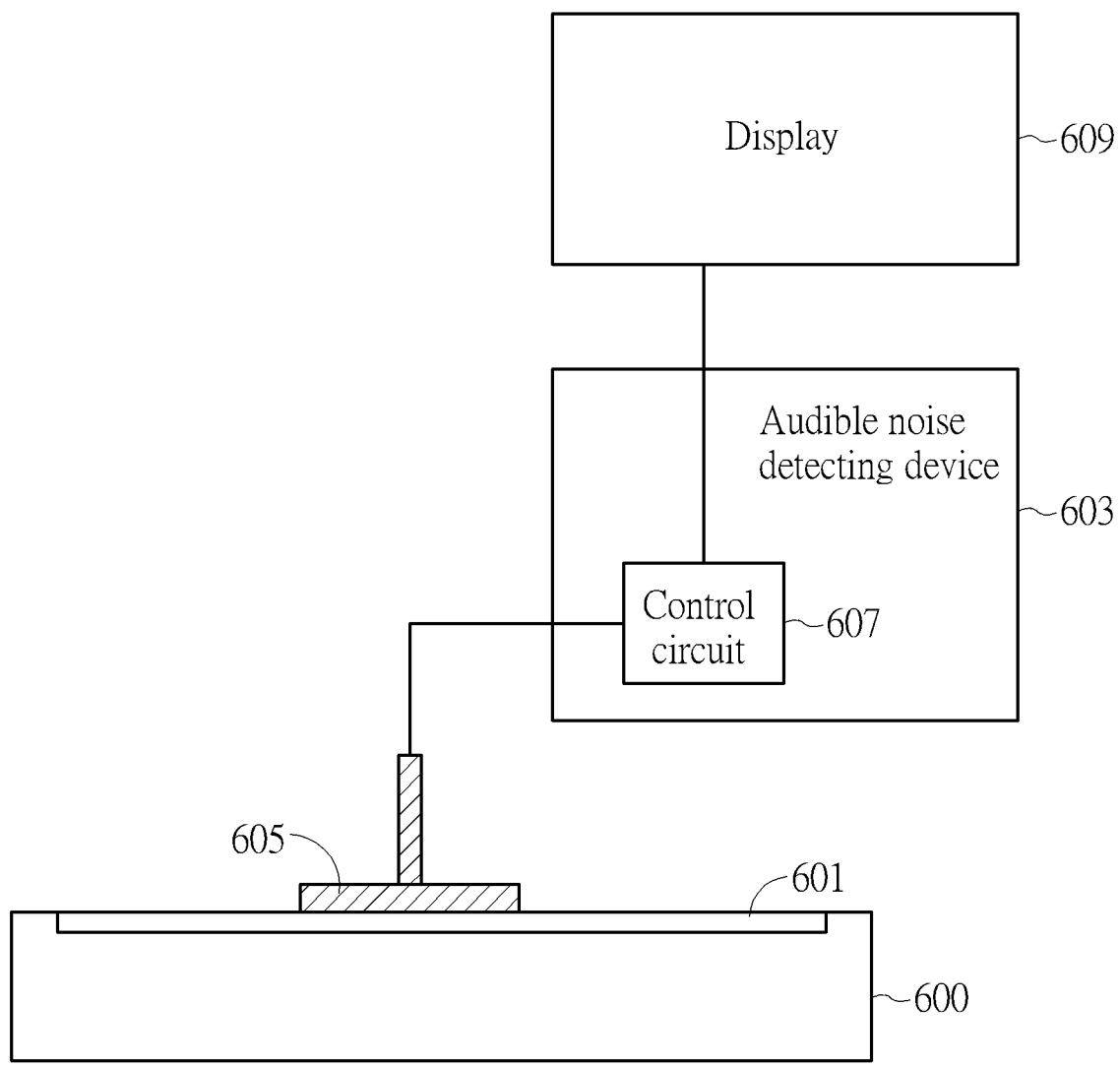
FIG. 6 and FIG. 7 are schematic diagrams illustrating the device for performing audible noise detecting according to different embodiments of the present invention.
Figure 7:
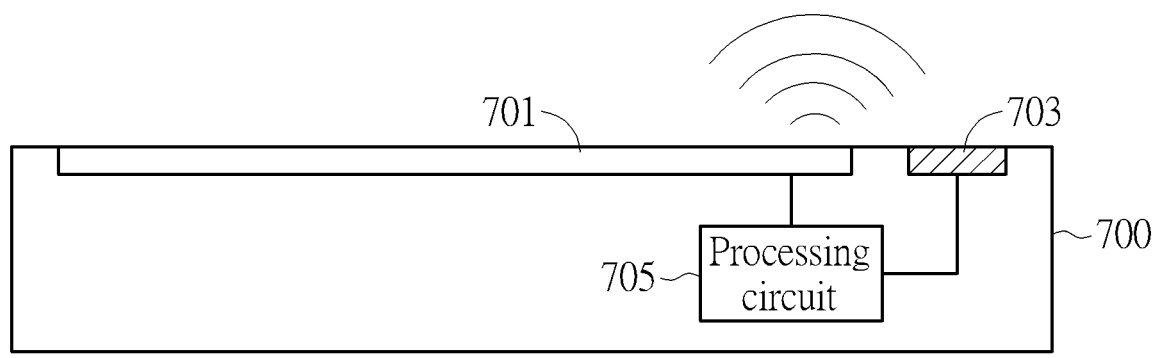

FIG. 6 and FIG. 7 are schematic diagrams illustrating the device for detecting the audible noise according to different embodiments of the present invention. In the embodiment of FIG. 6, the electronic device 600 comprises a touch screen 601. An audible noise detecting device 603 comprising a receiver 605 touching the touch screen 601 is applied to detect the audible noise. The receiver 605 is configured to collect the audible noise. Data of the collected audible noise is transmitted to a control circuit 607 of the noise detecting device 603. The control circuit 607 can control the display 609 to display the collected noise data. The display 609 can locate inside the audible noise detecting device 603 or outside the audible noise detecting device 603.

In the embodiment of FIG. 7, the audible noise is detected by the electronic device itself rather than an external audible noise detecting device. As illustrated in FIG. 7, the electronic device 700 comprises a touch screen 701, a sound receiver 703 (e.g. a micro phone) and a processing circuit 705. The sound receiver 703 can collect the audible noise, and transmit data of the collected audible noise to the processing circuit 705. After that, the processing circuit 705 controls the touch screen 701 to display the data of collect audible noise.

FIG. 8 is a schematic diagram illustrating the advantage which the present invention can provide. As illustrated in FIG. 8, audible noise of the conventional electronic device may have larger peaks since the electronic device use a fixed mode switch frequency. However, the audible noise of the electronic device using the electronic device control method provided by the present invention may have smaller peaks since the electronic device use different mode switch frequencies. Please note, the detected audible noise is not limited to be displayed in the form shown in FIG. 8.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device control method, applied to an electronic device which can operate in a display mode and a touch sensing mode, comprising:
   (a) receiving a plurality of frames and displaying a first frame of the plurality of frames during a first frame time and displaying a second frame of the plurality of frames during a second frame time following the first frame time;
   (b) controlling the electronic device to have a first mode switch frequency; and
   (c) at a specific time point within the first frame time and the second frame time, controlling the electronic device to have a second mode switch frequency different from the first mode switch frequency in response to the specific time point being reached;
   wherein the first mode switch frequency and the second mode switch frequency are frequencies for switching between the display mode and the touch sensing mode, the first mode switch frequency has a first fixed ratio between a display time and a touch sensing time, the second mode switching frequency has a second fixed ratio between a display time and a touch sensing time, and the first fixed ratio is different from the second fixed ratio; wherein during the first mode switch frequency, there are at least two first display times and at least two first touch sensing times, during the second mode switch frequency there are at least two second display times and at least two second touch sensing times, the first display times are the same, the first touch sensing times are the same, the second display times are the same, the second touch sensing times are the same, the first display time is different from the second display time, or the first touch sensing time is different from the second touch sensing time.

2. The electronic device control method of claim 1, wherein the electronic device has the first mode switch frequency during the first frame time and has the second mode switch frequency during the second frame time.

3. The electronic device control method of claim 1, wherein the electronic device has the first mode switch frequency and the second mode switch frequency during the first frame time, and during the first frame time, the electronic device alternates between the first mode switch frequency and the second mode switch frequency at a predetermined rate.

4. The electronic device control method of claim 3, wherein the electronic device alternates between the first mode switch frequency and the second mode switch frequency every period of a display time and a touch sensing time.

5. The electronic device control method of claim 1, further comprising:
   detecting audible noise generated due to the electronic device switching between the display mode and the touch sensing mode.

6. The electronic device control method of claim 5, wherein the electronic device comprises a touch screen, and the step of detecting the audible noise is performed via using an audible noise detecting device touching the touch screen.

7. The electronic device control method of claim 5, wherein the electronic device comprises a sound receiver configured to collect the audible noise.

8. The electronic device control method of claim 1, wherein the electronic device is controlled by a TDDI IC to switch between the display mode and the touch sensing mode.

9. An electronic device, comprising:
   a display;
   a touch interface; and
   a processing circuit, coupled to the display and the touch interface;
   wherein the processing circuit receives a plurality of frames, displays a first frame of the plurality of frames during a first frame time and displays a second frame of the plurality of frames during a second frame time following the first frame time, controls the electronic device to operate at a first mode switch frequency and a second mode switch frequency different from the first mode switch frequency and the processing circuit controls the electronic device to change from the first mode switch frequency to the second mode switch frequency at a specific time point within the first frame time and the second frame time in response to the specific time point being reached;
   wherein the first mode switch frequency and the second mode switch frequency are frequencies for switching between the display mode and the touch sensing mode, the first mode switch frequency has a first fixed ratio between a display time and a touch sensing time, the second mode switching frequency has a second fixed ratio between a display time and a touch sensing time, and the first fixed ratio is different from the second fixed ratio; wherein during the first mode switch frequency, there are at least two first display times and at least two first touch sensing times, during the second mode switch frequency there are at least two second display times and at least two second touch sensing times, the first display times are the same, the first touch sensing times are the same, the second display times are the same, the second touch sensing times are the same, the first display time is different from the second display time, or the first touch sensing time is different from the second touch sensing time.

10. The electronic device of claim 9, wherein the processing circuit controls the electronic device to have the first mode switch frequency during the first frame time and to have the second mode switch frequency during the second frame time.

11. The electronic device of claim 9, wherein the processing circuit controls the electronic device to have the first mode switch frequency and the second mode switch frequency during the first frame time, and during the first frame time, the electronic device alternates between the first mode switch frequency and the second mode switch frequency at a predetermined rate.

12. The electronic device of claim 11, wherein the electronic device alternates between the first mode switch frequency and the second mode switch frequency every period of a display time and a touch sensing time.

13. The electronic device of claim 9, wherein the electronic device comprises a sound receiver configured to collect audible noise generated due to the electronic device switching between the display mode and the touch sensing mode.

14. The electronic device of claim 9, wherein the electronic device comprises a TDDI IC and is controlled by the TDDI IC to switch between the display mode and the touch sensing mode.

15. The electronic device control method of claim 3, wherein the electronic device alternates between the first mode switch frequency and the second mode switch frequency at least every two periods of a display time and a touch sensing time.

16. The electronic device of claim 11, wherein the electronic device alternates between the first mode switch frequency and the second mode switch frequency at least every two periods of a display time and a touch sensing time.

\* \* \* \* \*